Robert L. Stone
INVENTOR.

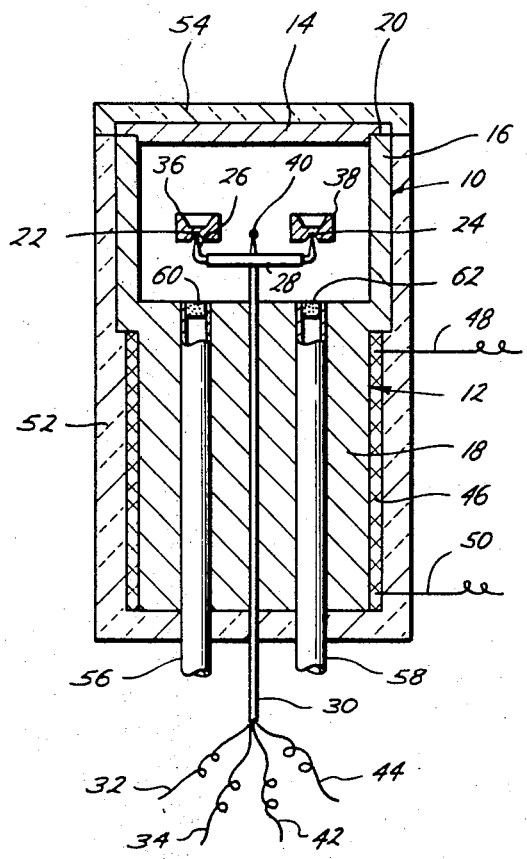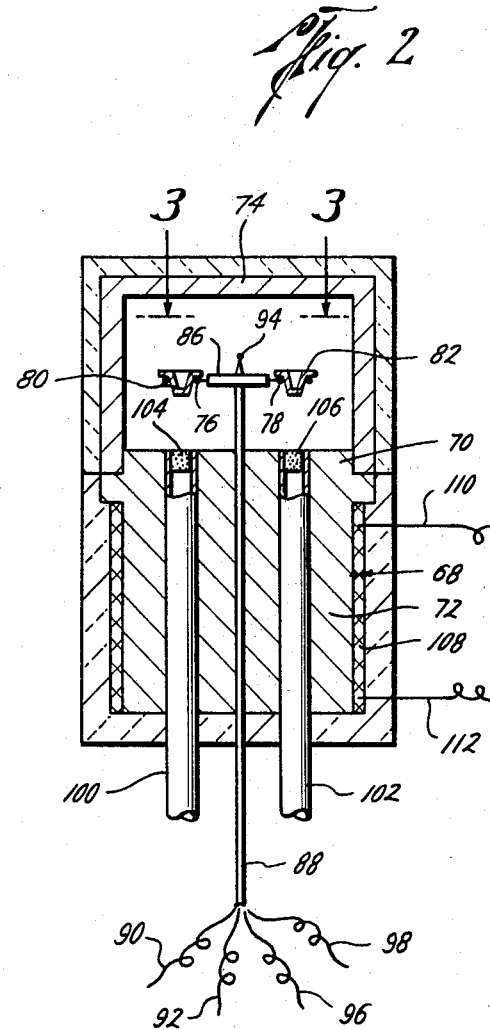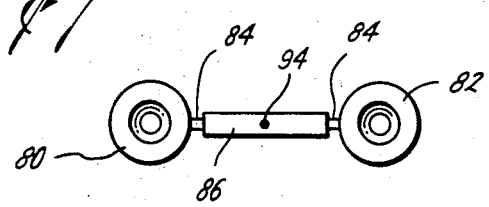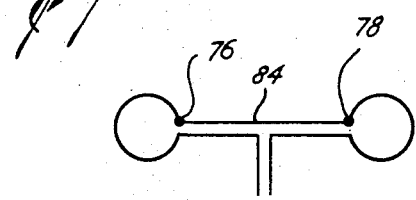

BY Arnold and Roylance,
ATTORNEYS

Robert L. Stone
INVENTOR.

BY Arnold and Roylance

ATTORNEYS

Nov. 3, 1970         R. L. STONE         3,537,294
DIFFERENTIAL THERMAL ANALYSIS
Filed June 25, 1965                   4 Sheets-Sheet 4
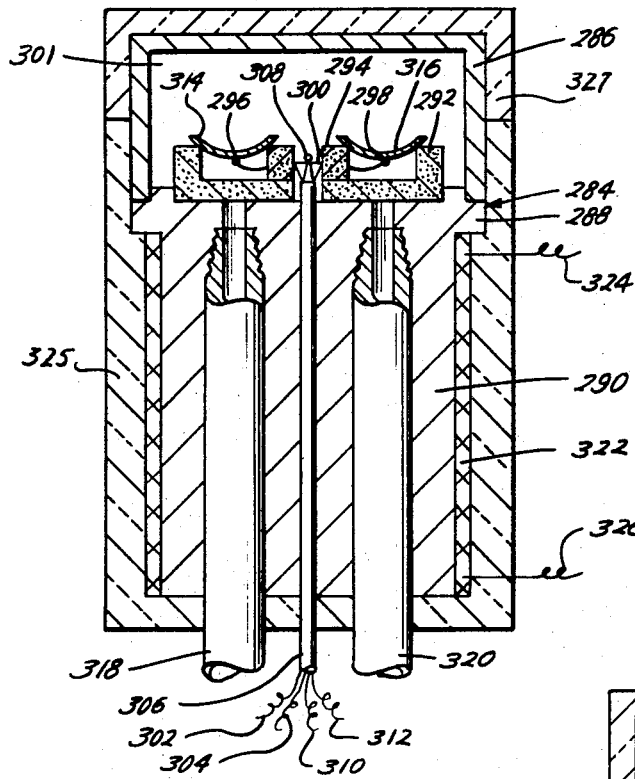
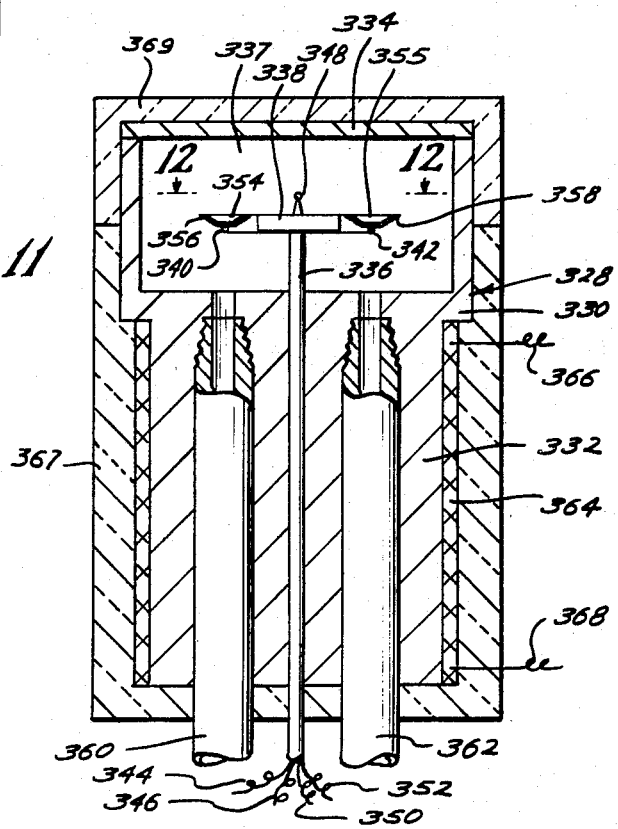
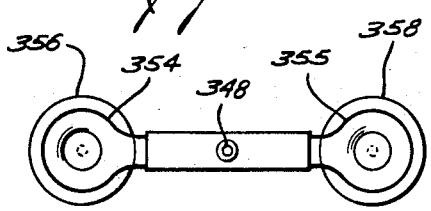
Robert L. Stone
INVENTOR.
BY Arnold and Roylance
ATTORNEYS United States Patent Office 3,537,294
Patented Nov. 3, 1970

3,537,294
DIFFERENTIAL THERMAL ANALYSIS
Robert L. Stone, Austin, Tex., assignor, by mesne assignments, to Tracor, Inc., Austin, Tex., a corporation of Texas
Filed June 25, 1965, Ser. No. 467,071
Int. Cl. G01n 25/20
U.S. Cl. 73—15                                5 Claims

ABSTRACT OF THE DISCLOSURE

An improvement in a differential thermal analysis apparatus is provided in which the thermocouple wires at least partially support the sample holders and wherein the wires are held in place by a material of low heat capacity and thermal conductivity extending into the heating chamber.

ABSTRACT OF THE DISCLOSURE

The invention concerns differential thermal analysis, and particularly concerns means and methods which may be employed to obtain an analysis of a sample.

Differential thermal analysis is basically a technique for observing changes in energy level of a sample substance as a function of temperature. The changes may be observed by providing a pair of thermocouples connected in opposing electrical relationship with electrical leads from their other ends, placing a sample substance near one of the thermocouples and a reference substance near the other, heating the sample substance and the reference substance at a programmed rate, and observing the differential voltage developed by the pair of thermocouples. The voltage differential developed is proportional to the changes in energy level of the sample substance different from the changes in energy level of the known or reference substance.

The differential voltage developed may be traced on a chart by conventional techniques to form a record of the differential voltage over the heating range. Usually a standard thermocouple is disposed near the differential thermocouples to indicate the actual temperature around the sample in order to plot on the chart the differential voltage against the actual temperature. The graphs obtained are characteristic of the sample substance with respect to the reference substance, and may be employed for identification purposes. The graphs are also useful in the determination of the characteristics of a known sample substance, such as melting point, vaporization point, temperature at which a change in crystalline structure occurs, and the like. If a reactive substance or a reactive atmosphere is placed around or sufficiently near the sample substance, the temperature of reaction can also be obtained by the above technique. Further, the magnitude of the differential voltage indicates the heat of reaction.

Although differential thermal analysis is basically a simple technique, there are many difficulties which must be overcome in order to obtain a clear, easily readable graph or chart representative of the characteristics of the sample substance. Obviously, the apparatus for the analysis should be very sensitive and able to detect and convey to the graph minute changes in energy level of the sample substance. The apparatus should be capable of good resolution between closely adajcent thermal loops on the graph in order for the graph to indicate and distinguish among complex series of reactions. The apparatus should also be capable of producing a portrayal of the changes in energy level without spurious loops or wiggles which obscure the actual changes. Drift from the base line representing the reference sample as well as the characteristics of the apparatus should also be minimized.

The invention provides at least one novel combination of components for use in apparatus for analyzing a sample by differential thermal analysis, which combination can provide improved performance and results over prior designs. An apparatus for differential thermal analysis in accordance with the invention can exhibit good sensitivity and resolution with a minimization of drift. In addition, the invention provides at least one novel method suitable for analyzing a sample by differential analysis.

One combination in accordance with the invention comprises a sample holder enclosure comprising a sample holder block and a cap for the block, the block and the cap being made of thermally conductive material, and the block having a sample enclosing portion and an extension thereon of a size sufficient to permit heat in the extension to transfer through the block and cap and to maintain substantially uniform temperature through the block and cap. Means for heating the extension and thereby the block and cap are provided near, preferably in contact with, the extension, and a pair of thermocouples electrically connected in opposing electrical relationship and being adapted to be associated with a sample and a reference material respectively are disposed in the sample holder enclosure. Electrical lead means are associated with the thermocouples for permitting measurement of differential voltage developed during analysis.

This combination can minimize uneven convection currents and uneven radiation which tend to cause spurious loops and wiggles in the representative graph, and can provide good sensitivity and resolution. The structural features of the combination can also minimize the harmful effects of discontinuities usually found in materials of construction.

One method in accordance with the invention for analyzing a sample by differential thermal analysis comprises placing a sample material and a reference material respectively near a pair of thercomouples electrically connected in opposing electrical relationship and disposed in a sample holder enclosure having an extension thereon of size sufficient to permit heat in the extension to transfer through the enclosure; heating the extension sufficiently to increase the temperature of the enclosure and of the sample material and reference material; and measuring the differential voltage developed by the thermocouples during heating.

One particular advantage of the above combination and method is that heat in the extension on the sample holder enclosure can warm gas passing into the sample holder enclosure through gas inlet means located to extend through the extension and communicate with the interior of the sample holder enclosure. Thus, gas entering the sample holder enclosure can be at proper temperature for operation of the apparatus, thereby permitting achievement of good results with avoidance of uneven convection currents and resultant spurious loops and wiggles in the representative graph of differential voltage. Consequently, the apparatus and methods described herein are particularly useful for analysis of a sample in the presence of gas, particularly dynamic or reactive gas.

The invention also provides other appartus which can effect good results when used in differential thermal analysis. These apparatus are described hereinafter.

In the drawing:

FIG. 1 is a partially sectional and partially schematic view of an embodiment of the invention which may be employed in apparatus for analyzing a sample by differential thermal analysis;

FIG. 2 is a partially sectional and partially schematic view of another embodiment of the invention which may be employed in apparatus for analyzing a sample by differential thermal analysis;

FIG. 3 is a view taken along the line 3—3 in FIG. 2;

FIG. 4 is a schematic view of the differential thermocouple pair employed in the apparatus shown in FIG. 2 and FIG. 3;

FIG. 10 is a partially sectional and partially schematic view of still another embodiment of the invention which may be employed in apparatus for analyzing a sample by differential thermal analysis;

FIG. 11 is a partially sectional and partially schematic view of still another embodiment of the invention which may be employed in apparatus for analyzing a sample by differential thermal analysis; and FIG. 12 is a view taken along the line 12—12 in FIG. 11.

Figure 5:
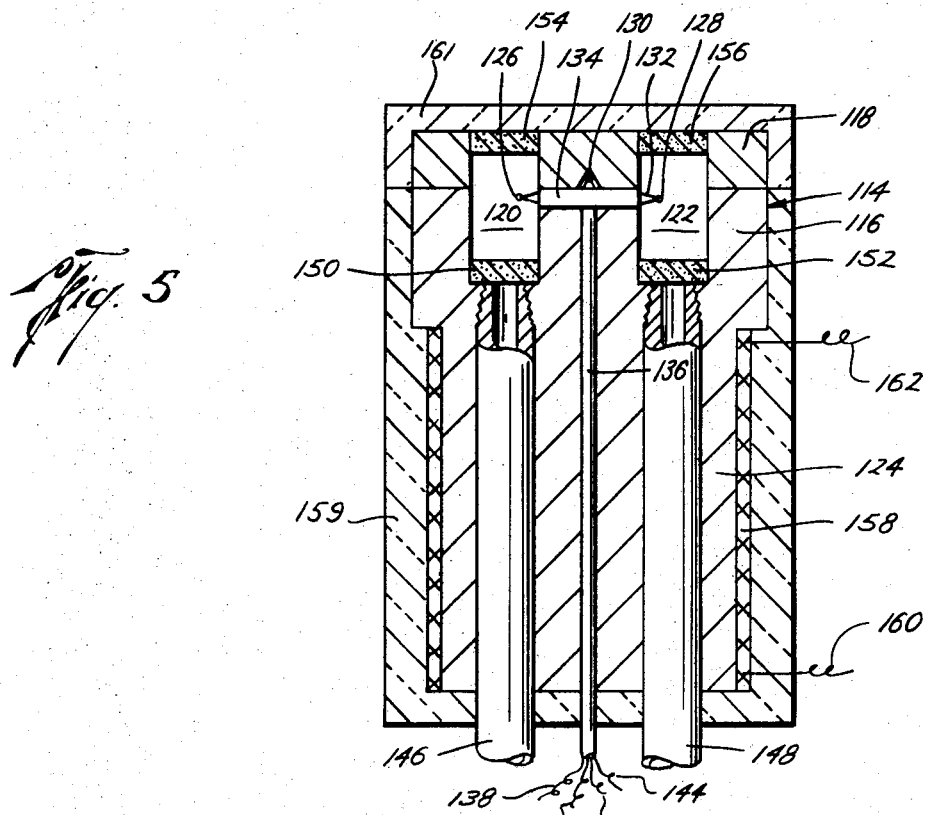
FIG. 5 is a paritally sectional and partially schematic view of still another embodiment of the invention which may be employed in apparatus for analyzing a sample by differential analysis.

With reference to FIG. 1, an assembly for use in apparatus for analyzing a sample by differential thermal analysis is shown, which assembly comprises a combination of a sample holder enclosure 10 comprising a sample holder block 12 and a cap 14 fitting over the open end of the block 12. The block 12 comprising a sample-enclosing cup-shaped portion 16 which in turn comprises a substantially cylindrical portion with a substantially flat portion closing the bottom end of the cylindrical portion. Depending from the bottom or base of the sample-enclosing portion 16 of the block 12 is an extension 18, which as shown is preferably integral with the sample-enclosing portion 16.

The cap 14 as shown is a disc shaped to fit over the open end of the sample-enclosing portion 16 of the block 12. The block 12 and the cap 14 are preferably provided with mating lips, as shown at 20, to help hold them in proper relationship.

The sample holder enclosure and the extension thereon, of course, may be circular, oval, or rectangular in section, although a circular section is preferred, and the enclosure and extension may be of different shapes in section.

A pair of differential thermocouples 22 and 24 are positioned in the interior of the enclosure 10, preferably away from the walls thereof, and the thermocouples 22 and 24 are electrically connected by wire 26 in opposing electrical relationship with respect to voltage. Preferably, the wire 26 exists entirely within the sample holder enclosure. The remaining free ends of the thermocouples 22 and 24 pass into the electrically nonconductive tube 28 or other elongated member, into the electrically nonconductive tube 30 or other elongated member, and out of the assembly as electrical lead means 32 and 34.

The electrically nonconductive tubes 28 and 30 are preferably also thermally nonconductive to minimize uneven heat distribution to the thermocouples 22 and 24 and the interior in general from the walls of the enclosure 10. As used herein, the term "nonconductive" refers to a resistance of sufficient magnitude to accomplish the intended purpose, and obviously is not intended to refer to an infinite or perfect resistance.

The tubes 28 and 30 contain one or more ducts through which the wire 26 and the wires constituting the electrical lead means 32 and 34 pass. The ducts are preferably positioned to provide sufficient electrical insulation between wires, although the wires themselves may be provided with insulation when the wires pass through a common duct.

The tubes 28 and 30 as shown provide a means for positioning the thermocouples 22 and 24 in the interior of the enclosure 10, although other suitable means may be employed. The nonconductive tube 30 may be held in place by either the block 12 or other suitable means, taken with friction, adhesives, mechanical holding, and the like, and preferably carries and holds in place the nonconductive tube 28. The electrical lead means 32 and 34 passing through the tubes 28 and 30 may be employed to connect the two tubes 28 and 30 and hold them together.

A reference sample container 36 in the form of a cup with a depression in the bottom for receiving the thermocouple 22 is disposed on the thermocouple 22, and a sample container 38 similar to the reference sample container 36 is disposed on the thermocouple 24. The thermocouples 22 and 24 and the sample and reference containers 36 and 38 may be so shaped that the thermocouples 22 and 24 hold the containers 36 and 38 in position. The containers 36 and 38, however, may be held in position near the thermocouples 22 and 24 by any other suitable means, but direct thermal conductivity from the walls of the enclosure 10 should be maintained near a minimum.

Substantially solid sample blocks having two spaced bores therein for receiving sample and reference containers may be used instead of the sample block described above. The differential thermocouples may be disposed in the bores in the sample block in much the same manner as described above for reception of a sample container, and a cap in the form of a disc may close the bores of the sample holder block during analysis. Although this construction of a sample holder block is not preferred, it may be employed as a component of the combination of the invention if one so desires.

A standard thermocouple 40 is disposed near the sample and reference containers 36 and 38, and has electrical lead means 42 and 44 which pass from the thermocouple 40 through the nonconductive tube 28, through the nonconductive tube 30, and then out of the assemby. The electrical lead means 42 and 44 may be led from the interior of the enclosure 10 in a manner similar to that for the electrical lead means 32 and 34.

A heater 46 of any suitable design, preferably an electrical resistance heater such as a coil of resistive wire, is disposed around the extension 18 of the sample holder block 12, the heater having electrical lead means 48 and 50. The heater 46 is preferably disposed adjacent to and in direct contact with the extension 18. When the heater 46 is energized, the heat entering the extension 18 will flow throughout the sample holder block 12 as well as the cap 14.

The sample holder enclosure 10 including the cap 14 and the block 12 is preferably made of thermally conductive material. As used herein, the term "thermally conductive" refers to a conductivity of sufficient magnitude to accommplish the intended purpose and obviously is not intended to refer to an infinite or perfect conductivity.

In order to minimize temperature differences in the sample holder enclosure 10, the extension 18 is preferably of a size sufficient to permit heat in the extension 18 to transfer through the block 12 and the cap 14. A substantially uniform temperature through the block and the cap should be maintained for best results. In this regard, the extension 18 preferably has a diameter equal to at least about one-half the diameter of the sample-enclosing portion 16 of the block 12 in order to obtain best results. An extension 18 of this size appears to act as a reservoir of heat for transfer throughout the enclosure 10, thereby minimizing uneven temperatures in the sample-enclosure 10.

A body 52 of insulation around the sample holder block 12 and a second body 54 of insulation insulate the block 12 and the cap 14 from ambient conditions. The heater 46 may be carried and held in place against the extension 18 by the body 52 of thermal insulation, or may be held on the extension 18 by other suitable means such as friction, adhesives, mechanical bonding, and the like. The insulation 52 can be a series of cylindrical radiation shields and may be removable to permit quick cooling. The insulation may also be water-cooled.

Thus, when a test sample is placed in the sample container 38 and a reference sample is placed in the reference sample container 36, and the heater 46 is energized to provide a programmed rate of heat increase in the interior of the enclosure 10, the test sample may be analyzed by differential thermal analysis by reading the differential voltage developed across the electrical lead means 32 and 34, and plotting the differential voltage against the actual temperature as represented by the voltage output across the electrical lead means 42 and 44 from the standard thermocouple 40.

To obtain a programmed rate of temperature increase in the enclosure 10 as measured by the thermocouple 40, the voltage output across electrical leads 42 and 44 may be employed to control a current source across the electrical leads 48 and 50 in accordance with known techniques. Of course, a lag in indication by the standard thermocouple 40 must be considered in the design. Furthermore, the differential voltage across the electrical leads 32 and 34 may be first amplified by any suitable means and then transmited to a chart recorder for portrayal of the changes in energy level in the test sample, all if desired in accordance with known techniques.

The enclosure 10 preferably includes gas inlet means for permitting the sample to be bathed in a gas of known composition during the differential thermal analysis. Such a gas can sweep away any gases evolved from the sample and can thus maintain a known composition around the sample at all times. In addition, a dynamic or flowing gas around the sample helps improve the resolution of the apparatus for differential thermal analysis. A gas reactive with the sample may also be employed to determine temperatures at which reactions take place.

As shown in FIG. 1, gas inlet means is preferably associated with the block 12 and comprises a pair of tubes 56 and 58 through which a gas may be introduced into the interior of the enclosure 10. The tubes 56 and 58 are preferably arranged to bathe the test sample as well as the reference sample sufficiently to keep a gas of relatively known composition around the sample. The tubes 56 and 58 may be screwed into or press-fitted into the extension 18, or they may be screwed into or press-fitted into the bottom of the extension 18 with holes drilled through the extension up to the enclosure 10 serving as part of the gas inlet means. The open ends of the tubes 56 and 58 in the enclosure 10 preferably include porous discs 60 and 62 through which gas can flow, but which minimize turbulence in the atmosphere in the enclosure 10. The porous discs 60 and 62 may be made of any suitable material which is sufficiently nonreactive under conditions of analysis, for example, aluminum oxide, beryllium oxide, sintered nickel, other sintered metals, and the like. Gas entering the enclosure 10 from the gas inlet means may flow from the enclosure 10 through the junction between the block 12 and the cap 14, or by any suitable means provided in the enclosure 10.

A construction in accordance with the invention is particularly advantageous when gas inlet means is employed to introduce a gas into the interior of the sample holder enclosure. Best results can be obtained by placing the gas inlet means in a manner such that it extends at least partially through the extension 18 and communicates with the interior of the enclosure 10. Thus heat in the extension 18 will warm the gas to a temperature which will not disturb the programmed rate of the temperature increase in the interior of the enclosure 10. In this regard, the extension 18 should be large enough including long enough to provide gas at the entrance to the interior of the enclosure 10 of a temperature substantially equal to the temperature within the interior of enclosure 10.

It will be noted that a construction in accordance with the invention permits use of a single heating means for heating all of the materials which are near or come in contact with the sample material. A single heating means permits easier control of the rate of temperature increase and consequently minimizes temperature differentials and their harmful effects during analysis. In instruments as sensitive as differential thermal analysis equipment must be, such a feature can be very important for good results.

A preferred embodiment of the invention is shown in FIG. 2. This embodiment comprises a sample block 68 having a substantially flat sample-enclosing portion 70 and a heat absorbing extension 72 depending from the substantially flat sample-enclosing portion 70. A cup-shaped cap 74, which is shaped to fit over and against the sample-enclosing portion 70 of the block 68, is disposed over the block 68. A pair of differential thermocouples 76 and 78 are disposed in the space defined by the cap 74 and the block 68 and have sample containers 80 and 82 resting thereon. With reference to FIG. 3 and FIG. 4 as well as FIG. 2, a wire 84 connects the thermocouples 76 and 78 in opposing electrical relationship, and the remaining free ends of the thermocouples 76 and 78 pass into the nonconductive tube 86, into another nonconductive tube 88, and from the assembly as electrical lead means 90 and 92. A standard thermocouple 94 is disposed near the sample containers 80 and 82 with its ends passing through the nonconductive tube 86, through the nonconductive tube 88, and out of the assembly as electrical lead means 96 and 98. Gas inlet means comprising tubes 100 and 102 extends through the extension 72 and communicates with the interior space defined by the block 68 and the cap 74. Porous discs 104 and 106 are disposed in the ends of the tubes 100 and 102 to minimize turbulence in the interior space as gas passes therein from the tubes 100 and 102. A heater 108 is disposed around and against the extension 72 and has electrical lead means 110 and 112 for energizing the heater 108. This embodiment functions in a manner similar to the embodiment shown in the assembly of FIG. 1, but it has been found that very good results can be obtained with an assembly like the one shown in FIG. 2.

The thermocouple pair shown in FIG. 2, FIG. 3, and FIG. 4 is particularly suitable for use in differential thermal analysis. Broadly, each of the thermocouples comprises a loop of sufficient diameter and sufficient closure to accept a sample container thereon and a junction in the loop, whereby the junction is closely associated with a sample container when accepted thereon. The sample container as shown in FIG. 2 may comprise a small dish which fits into the opening within the closure of the loop. Several specific designs of this type of thermocouple are shown in U.S. application Ser. No. 367,692, filed May 15, 1964, by Robert L. Stone et al., entitled "Thermocouple," the disclosure thereof being incorporated herein by reference.

As used herein, the term "sample container" refers to a means for directly holding a sample. The term "sample holder block" refers to a part of an enclosure which may be employed as a support member for mounting the differential thermocouples, but which does not in the ordinary course hold directly a reference or sample substance.

Another embodiment in accordance with the invention is shown in FIG. 5. This embodiment comprises a sample block 114 comprising a sample-enclosing portion 116 with a second portion 118 attached thereto by suitable means such as screws (not shown) to facilitate assembly. The sample block 114 has two bores 120 and 122 therein for receiving a sample and a reference material respectively.

Depending from the sample-enclosing portion 116 is a heat-absorbing extension 124. A differential pair of thermocouples 126 and 128 are disposed such that the thermocouple 126 extends into the bore 120 and the thermocouple 128 extends into the bore 122. A standard thermocouple 130 is located within the sample block 114.

A wire 132 connects differentially the pair of thermocouples 126 and 128 and exists entirely within the sample block 114. The remaining leads of the thermocouples 126 and 128 pass through the nonconductive tube 134, into the nonconductive tube 136, and out of the assembly as electrical lead means 138 and 140. Electrical lead means 142 and 144 are connected with the standard thermocouple 130 and pass out of the assembly through the nonconductive tube 136. Gas inlet means comprising tubes 146 and 148, which are screwed into the sample block 114, communicate with the bores 120 and 122. Porous discs 150 and 152 are disposed over the ends of the tubes 146 and 148 in the bottoms of the bores 120 and 122. A second set of porous discs 154 and 156 are located in the portion 118 of the sample block 114 over the bores 120 and 122. A heater 158 is disposed around and against the heat-absorbing extension 124 of the sample block 114 and has electrical lead means 160 and 162.

In this embodiment the sample and reference material may be located directly in the bores 120 and 122 in contact with the thermocouples 126 and 128 respectively. A cap (not shown) may be disposed over the portion 118 of the sample block 114 if so desired. Insulation 159 and 161 is provided around the assembly. This embodiment functions in a manner similar to the embodiment shown in the assembly of FIG. 1.

Figure 6:
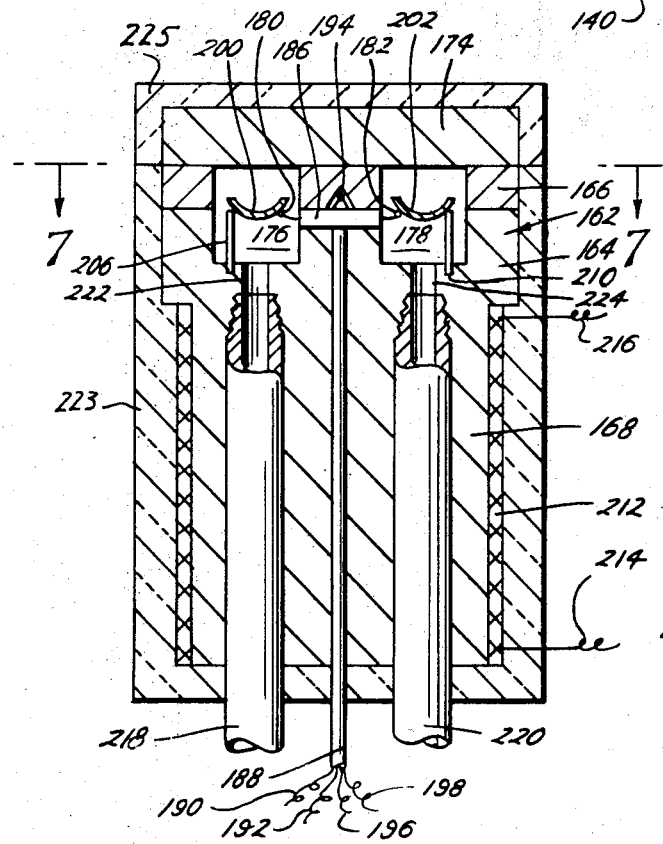
FIG. 6 is a partially sectional and partially schematic view of still another embodiment of the invention which may be employed in apparatus for analyzing a sample by differential analysis.
Figure 7:
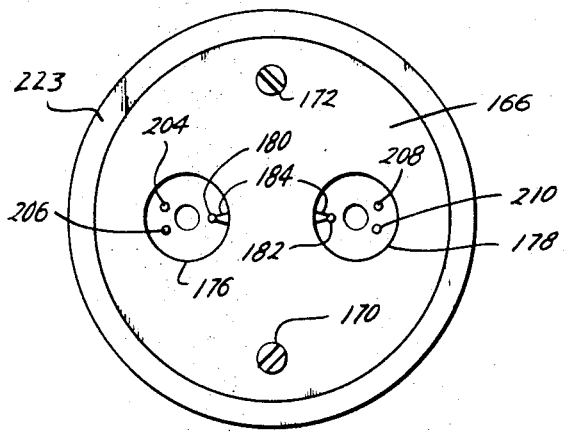
FIG. 7 is a view taken along the line 7—7 in FIG. 6 with the sample containers removed.

Another embodiment in accordance with the invention is shown in FIG. 6 and FIG. 7. This embodiment comprises a sample holder block 162 having a sample-enclosing portion 164 and a second portion 166 attached to the portion 164 with an extension 168 depending from the sample-enclosing portion 164. The portion 166 may be attached to the portion 164 by screws 170 and 172 as shown in FIG. 7. The separate portion 166 facilitates assembly. A cap 174 is disposed over the portion 166 of the sample block 162.

A pair of bores 176 and 178 are provided in the sample block 162 and a differential pair of thermocouples 180 and 182 are disposed such that thermocouple 180 extends into the bore 176 and thermocouple 182 extends into the bore 178. The thermocouples 180 and 182 are connected differentially by a wire 184 existing entirely within the sample block 162. The remaining leads from the thermocouples 180 and 182 pass out of the assembly through ducts in nonconductive tube 186 and nonconductive tube 188 as electrical lead means 190 and 192. A standard thermocouple 194 is located in the sample block 162 and its electrical leads pass out of the assembly through ducts in nonconductive tube 188 as electrical lead means 196 and 198.

The differentially connected thermocouples 180 and 182 are constructed to provide support of at least a partial amount of weight of the sample containers 200 and 202. A pair of pins 204 and 206 is located in the bore 176 to provide in combination with the thermocouple 180 support of the sample container 200. As shown, the pins 204 and 206 are mounted directly in the sample block 162, but they may be mounted in any suitable manner. Likewise, a pair of pins 208 and 210 is located in the bore 178 to provide in combination with thermocouple 182 support of the sample container 202. The pins provide means independent of the differentially connected thermocouples for supporting the sample containers in combination with the differentially connected thermocouples. Preferably the pins extend substantially vertically above the top face of the block below the thermocouples for a distance substantially equal to the distance between the top face of the block and the thermoelectric junctions of the thermocouples. As shown, the independent means for support of a sample container supports the sample container at at least two points in addition to the support provided by the thermocouple.

A heater 212 is provided around the heat-absorbing extension 168 of the sample block 162, and it has electrical lead means 214 and 216. Gas inlet means comprising tubes 218 and 220 are screwed into the bottom of the extension 168 and small bores 222 and 224 in the sample block 162 communicate with both the bores 176 and 178 and the bores in the tubes 218 and 220 respectively. Insulation 223 and 225 is provided around the assembly.

The embodiment shown in FIG. 6 and FIG. 7 functions in a manner similar to that described with respect to the embodiment in FIG. 1. The means for supporting the sample container shown in FIGS. 6 and 7, however, can be an important feature in differential thermal analysis apparatus.

Figure 8:
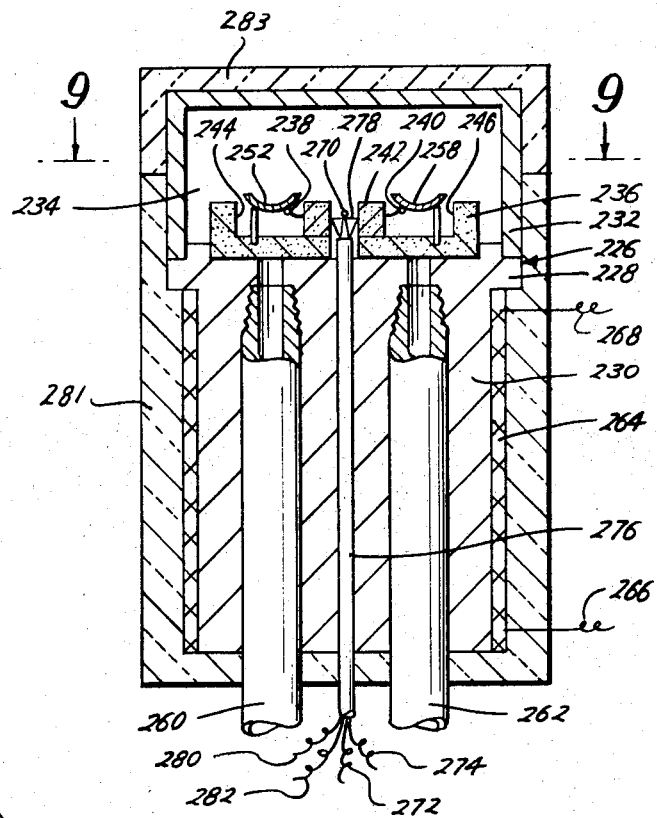
FIG. 8 is a partially sectional and partially schematic view of still another embodiment of the invention which may be employed in apparatus for analyzing a sample by differential thermal analysis.
Figure 9:
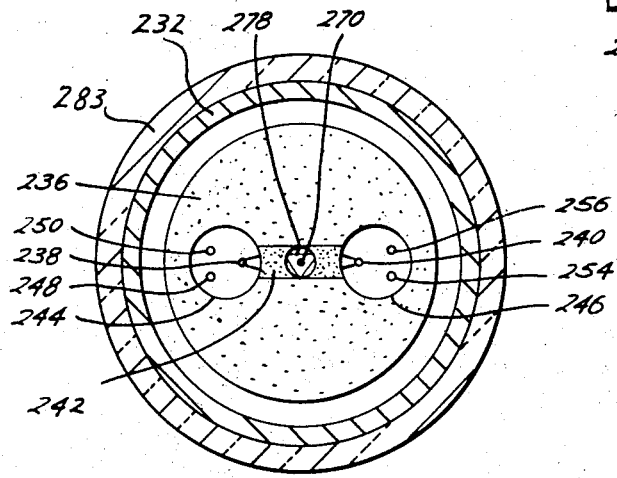
FIG. 9 is a view taken along the line 9—9 in FIG. 8 with the sample containers removed.

Another embodiment in accordance with the invention is shown in FIG. 8 and FIG. 9. This embodiment comprises a sample holder block 226 comprising a sample-enclosing portion 228 and a heat-absorbing extension 230 thereon. A cup-shaped cap 232 fits over the sample holder block 226 to define an interior space 234. A body 236 of rigid material rests on the sample block 226 and tightly holds a differential pair of thermocouples 238 and 240 in position. The body 236 is made of a material of low heat capacity and low thermal conductivity, and a portion 242 of the body 236 of rigid material is preferably set in place around the wires of the thermocouples 238 and 240 to hold the thermocouples tightly in position. The body 236 of rigid material may be made of a ceramic material such as aluminum oxide and may be fired either totally in place or partially in place. Suitable resins which are settable, such as thermally settable, may also be employed depending of course upon the operating characteristics intended.

The body 236 of rigid material is constructed such that two bores 244 and 246 exist therein. Located in the bore 244 is a pair of pins 248 and 250 which in combination with the thermocouple 238 provides support of a sample container 252. Likewise, in the bore 246 is a pair of pins 254 and 256 which in combination with the thermocouple 240 provides support of a sample container 258. The pins 248, 250, 254, and 256 are set in the body 236 of rigid material and are in turn supported by the sample block 226. Gas inlet means comprising tubes 260 and 262 communicate with the interior 234. Since the body 236 may be of sufficient porosity to be gas permeable, especially when made of a ceramic material such as aluminum oxide, gas may flow through the body 236 of rigid material into the interior space 234. A heater 264 fits around the heat-absorbing extension 230 and has electrical lead means 266 and 268. A standard thermocouple 270 is located in the interior space 234 and has electrical lead means 272 and 274 which pass out of the assembly by way of ducts in a nonconductive tube 276. The differential pair of thermocouples 238 and 240 has a wire 278 which connects the thermocouples 238 and 240 differentially and which exists entirely within the interior space 234. The thermocouples 238 and 240 have electrical leads 280 and 282 which pass out of the assembly through ducts in the nonconductive tube 276. Insulation 281 and 283 is provided around the assembly.

The embodiment in accordance with the invention shown in FIG. 8 and FIG. 9 operates in a manner similar to the embodiment shown in FIG. 1.

Another embodiment in accordance with the invention is shown in FIG. 10. This embodiment comprises a sample holder block 284 and a cup-shaped cap 286 fitting over the sample block 284 to form a sample holder enclosure. The sample holder block 284 comprises a sample-enclosing portion 288 with a heat-absorbing extension 290 depending therefrom. A body 292 of rigid material rests on the sample holder block 284 and preferably comprises a portion 294 fired or set in place around the leads from the differential pair of thermocouples 296 and 298.

The thermocouples 296 and 298 are differentially connected by a wire 300 existing entirely within the interior space 301 of the sample holder enclosure and the thermocouples 296 and 298 have electrical leads 302 and 304 which pass out of the assembly through ducts in nonconductive tube 306. A standard thermocouple 308 is provided in the interior space 301 and has electrical leads 310 and 312 which also pass out of the assembly through ducts in the nonconductive tube 306.

The thermocouples 296 and 298 are constructed such that when sample containers 314 and 316 are located on the body 292 of rigid material, the thermoelectric junctions of the thermocouples 296 and 298 are respectively at least near the sample containers 314 and 316, preferably in contact therewith. For this purpose, the thermocouples 296 and 298 in combination with their leads should be sufficiently resilient to ensure contact with the sample containers 314 and 316 respectively.

Gas inlet means comprising tubes 318 and 320 communicates with the interior space 301 and the tubes are located to pass through the heat-absorbing extension 290. The body 292 of rigid material should be sufficiently porous to permit gas to pass from the tubes 318 and 320 into the interior space 301 of the sample holder enclosure. A heater 322 is disposed around the heat-absorbing extension 290 and has electrical lead means 324 and 326. Insulation 325 and 327 is provided around the assembly.

The embodiment shown in FIG. 10 functions in a manner similar to the embodiment shown in FIG. 1.

Another embodiment in accordance with the invention is shown in FIG. 11 and FIG. 12. This embodiment comprises a sample holder block 328 comprising a cup-shaped sample enclosing portion 330 with a heat-abosrbing extension 332 depending therefrom. A disc-shaped cap 334 fits over the sample block 328 to form a sample holder enclosure. A nonconductive tube 336 projects into the interior space 337 within the sample holder block 328 and the cap 334, and supports a second nonconductive tube 338. Each of the nonconductive tubes 336 and 338 have four parallel ducts passing longitudinally therethrough.

A differential pair of thermocouples 340 and 342 is located in the interior space, and the thermocouples have electrical leads 344 and 346 which pass out of the assembly by way of the ducts in the nonconductive tube 338 and the nonconductive tube 336. A standard thermocouple 348 located in the interior space has electrical leads 350 and 352 which pass out of the assembly by way of the ducts in the nonconductive tube 336. The thermocouple leads may be employed to hold the nonconductive tube 338 in position on the nonconductive tube 336, or cement may be employed.

Loops 354 and 355 of wire extend respectively from each end of the nonconductive tube 338 to provide means for holding the sample containers 356 and 358 in position on the differential pair of thermocouples 340 and 342. Thus, the sample containers 356 and 358 may be located in position for analysis merely by inserting them between the loops 354 and 355 of wire and the differential pair of thermocouples 340 and 342. Preferably, the loops 354 and 355 of wire and the differential pair of thermocouples 340 and 342 extend resiliently from the nonconductive tube 338 to ensure that the sample containers 356 and 358 are held in position tightly once properly located. The loops 354 and 355 of wire may be located in position by press-fitting their ends in the ducts in nonconductive tube 338.

Gas inlet means comprising tubes 360 and 362 communicates with the interior space of the sample holder enclosure to permit bathing of the sample material with a gas during analysis. A heater 364 fits around the heat-absorbing extension 332 and has electrical lead means 366 and 368. Insulation 367 and 369 is provided around the assembly.

The embodiment shown in FIG. 11 and FIG. 12 operates in a manner similar to the embodiment shown in FIG. 1.

The various parts described above may be made of any suitable material which serves the intended purpose. For example, the block, cap, sample containers, and gas inlet tubes may be made of aluminum, platinum, other noble metals, ceramics such as aluminum oxide, beryllium oxide, and magnesium oxide, stainless steel, Inonel, copper, and the like depending on the intended conditions of use. The thermally insulating materials may be any standard or other insulating materials, and the nonconductive tubes may be made of any suitable material or materials, for example, aluminum oxide, beryllium oxide, magnesium oxide, other ceramics, and the like.

The thermocouples are preferably junctions of platinum and an alloy of by weight 90 percent platinum and 10 percent rhodium, but may be made of other suitable materials depending on conditions. The electrical leads may be made of any suitable electrically conductive material. The reference material is preferably aluminum oxide since it is substantially inert under the ordinary conditions of analysis and since its energy change with respect to change in temperature is substantially linear.

The embodiments of the invention are useful in apparatus for analyzing a sample with respect to pressure as well as temperature. Thus, if the apparatus contains a means for pressurizing the atmosphere around the sample, the effects of pressure on the changes in energy level can be measured in accordance with procedures described hereinbefore. This technique is a part of the expanding use of the analyzing method referred to generally as differential thermal analysis, and the invention is applicable in general to all of the variations in this method.

Although the embodiments of the invention described specifically herein are preferred, other embodiments may be made without departing from the scope of the invention. The enclosure of the combinations in accordance with the invention, for example, may assume various configurations as long as the differential pair of thermocouples is located in a manner such that substantially even heat transfer to the reference and test samples and the differential thermocouples is effected. In this regard, a sample holder assembly in which the sample holder enclosure is constructed in a manner such that the thermocouples and the reference and sample materials are away from and not in direct contact with the walls of the enclosure is preferred. Furthermore, the cap and block of the sample holder enclosure, in combination, are preferably of a configuration which provides substantial symmetry around the thermocouples and the samples, although the configuration may be varied somewhat depending on the quality of results expected.

What is claimed is:

1. In apparatus for analyzing a sample by differential analysis, a combination comprising a sample holder enclosure comprising a sample holder block and a cap for said block, one of said block and cap being cup-shaped and the other being shaped to fit over the open end of the one which is cup-shaped, thereby defining an interior space; a differential pair of thermocouples positioned in the interior of said enclosure; and a body of rigid material resting on said sample block and tightly holding said thermocouples in position, said material being of low heat capacity and low thermal conductivity and at least a portion of said material being set in place tightly around the wires of said thermocouples.

2. In apparatus for analyzing a sample by differential analysis, a combination comprising a sample holder enclosure including a sample holder block, said block being made of thermally conductive material and having a sample-enclosing portion and an extension thereon of size sufficient to permit heat in said extension to transfer through said block and said enclosure and to maintain substantially uniform temperature through said enclosure; a differential pair of thermocouples positioned in the interior of said enclosure; and a body of rigid material resting on said sample holder block and tightly holding said thermocouples in position, said material being of low heat capacity and low thermal conductivity and at least a portion of said material being set in place tightly around the wires of said thermocouples.

3. In apparatus for analyzing a sample by differential thermal analysis, a combination comprising a sample holder enclosure comprising a sample holder block and a cap for said block, one of said block and cap being cup-shaped and the other being shaped to fit over the open end of the one which is cup-shaped, thereby defining an interior space; a differential pair of thermocouples positioned in the interior of said enclosure, the sample thermocouple for detecting thermal effects of the sample being positioned to permit reception of a sample container thereon at least near its thermoelectric junction and being constructed to support at least a portion of the weight of the sample container; and a member positioned above said sample thermocouple a distance sufficient to permit said sample container to be held in position between and by said member and said sample thermocouple.

4. The combination defined in claim 3 wherein said sample holder block includes a sample-enclosing portion and an extension thereon of size sufficient to permit heat in said extension to transfer through said enclosure and to maintain substantially uniform temperature through said enclosure; and said combination includes means for heating said extension and thereby said enclosure.

5. The combination defined in claim 3 wherein said member comprises a loop of wire.

References Cited

UNITED STATES PATENTS

| | | | |
|---|---|---|---|
| 3,285,053 | 11/1965 | Mazieres | 73—15 |
| 3,298,220 | 1/1967 | Stone et al. | 73—15 |
| 3,339,398 | 9/1967 | Barrall et al. | 73—15 |

OTHER REFERENCES

Skinner, Kenneth G., A Differential Thermal Analysis Apparatus for Temperatures up to 1575° C., May 24, 1957, pp. 1–8.

Torkar, K., Lasser, K., and Fritzer, Dynamic Differential Calorimetry, 1962.

White, J. L. and Koyama, Karl, Application of Differential Thermal Calorimetry . . ., in The Review of Scientific Instruments, October 1963, pp. 1104–1110.

JAMES J. GILL, Primary Examiner